United States Patent [19]

Schwarz

[11] Patent Number: 4,459,379

[45] Date of Patent: Jul. 10, 1984

[54] AQUEOUS DISPERSION OR EMULSION OF FILM-FORMING BINDERS

[75] Inventor: Günther Schwarz, Münster, Fed. Rep. of Germany

[73] Assignee: BASF Farben & Fasern AG, Hamburg, Fed. Rep. of Germany

[21] Appl. No.: 569,935

[22] PCT Filed: Mar. 24, 1982

[86] PCT No.: PCT/DE82/00067

§ 371 Date: Sep. 27, 1982

§ 102(e) Date: Sep. 27, 1982

[87] PCT Pub. No.: WO82/03401

PCT Pub. Date: Oct. 14, 1982

Related U.S. Application Data

[63] Continuation of Ser. No. 432,956, Sep. 27, 1982, abandoned.

[30] Foreign Application Priority Data

Mar. 31, 1981 [DE] Fed. Rep. of Germany ....... 3112694

[51] Int. Cl.$^3$ .................. C09D 3/52; C09D 3/68; C09D 5/02
[52] U.S. Cl. .................. 523/501; 106/252; 106/264; 523/500; 523/523; 523/526; 525/170
[58] Field of Search ............ 523/500, 501, 523, 526; 106/252, 264; 525/170

[56] References Cited

U.S. PATENT DOCUMENTS

| 3,181,965 | 5/1965 | Michelotti | 525/170 |
| 3,449,468 | 6/1969 | Vrotney et al. | 525/170 |
| 3,940,353 | 2/1976 | Martorano | 523/526 |
| 4,076,766 | 2/1978 | Simms | 525/170 |
| 4,151,148 | 4/1979 | Chasin et al. | 523/501 |
| 4,272,420 | 6/1981 | Frank et al. | 106/252 |
| 4,281,068 | 7/1981 | Frank et al. | 524/539 |
| 4,296,014 | 10/1981 | Hayashi et al. | 523/501 |
| 4,303,567 | 12/1981 | Frank et al. | 525/444 |

FOREIGN PATENT DOCUMENTS

| 3337 | 8/1979 | European Pat. Off. . |
| 14883 | 9/1980 | European Pat. Off. . |
| 21078 | 1/1981 | European Pat. Off. . |
| 833776 | 6/1981 | U.S.S.R. | 523/500 |

Primary Examiner—Ronald W. Griffin
Attorney, Agent, or Firm—Wells & Wells

[57] ABSTRACT

An aqueous film-forming binder dispersion or emulsion for use as a rapid-hardening coating and which may contain plasticizers, flatting agents, fillers, pigments, additives and assistants contains at least one acrylate polymer having a film-forming temperature of above 60° C. and at least one unsaturated polyester resin. It is used for producing rapid-hardening coatings on surfaces of various materials.

7 Claims, No Drawings

AQUEOUS DISPERSION OR EMULSION OF FILM-FORMING BINDERS

This application is a continuation of application Ser. No. 432,956, filed Sept. 27, 1982, now abandoned.

BACKGROUND OF THE INVENTION

The invention relates to aqueous film-forming binder dispersions or emulsions which are used as rapid-hardening coatings and may contain plasticizers, flatting agents, fillers, pigments, additives and assistants.

Aqueous emulsions of unsaturated polyester resins are known from European Patent Specification No. 3,337, corresponding to U.S. Pat. No. 4,281,068. They contain two unsaturated polyesters having $\beta,\gamma$-ethylenically unsaturated ether groups, and one of these polyesters additionally contains cocondensed polyalkylene glycol radicals. These known emulsions are free of monomers and contain waxes or paraffins as barrier agents to prevent inhibition of polymerization by atmospheric oxygen. These known emulsions can be hardened, in mixture with photoinitiators, with the aid of UV radiation or can be polymerized, in mixture with peroxides, at room temperature. They are proposed for the open-pore coating of wood or wood-like materials.

These known polyester emulsions have the disadvantage that they require a relatively long drying time, and, when using higher temperatures, an intermediate drying step over an evaporation zone is necessary to remove the water, since otherwise the film is made milky by water inclusions. When using a continuous operation where very short hardening times are important, the hardening time is not adequate to ensure that the material can be stacked or wound up.

SUMMARY OF THE INVENTION

The object of the present invention is therefore to provide aqueous dispersions or emulsions of this type for rapid-hardening coatings and which do not have the known disadvantages.

This object is achieved, surprisingly, by means of aqueous film-forming binder dispersions or emulsions which are used as rapid-hardening coatings and which contain at least one acrylate polymer having a film-forming temperature of above 60° C. and at least one unsaturated polyester resin.

Particularly good results are obtained with—and hence preferable are those—aqueous dispersions or emulsions in which 70 to 30% by weight of unsaturated polyester resin are used per 30 to 70% by weight of acrylate polymer, and the total of acrylate polymer and unsaturated polyester resin is 100% by weight.

The invention also relates to the use of the aqueous dispersion or emulsion for producing rapid-hardening coatings on surfaces of wood, wood materials, paper, fleeces, cured or uncured, woven or nonwoven substrates which are impregnated with impregnating resins, plastic sheeting, asbestos cement board, mineral fiber board and metals, such as, for example, aluminum.

The invention also relates to a process for producing a rapid-hardening coating on a substrate, which process comprises mixing the aqueous dispersion or emulsion according to the invention with a water-soluble peroxide hardener and, after application to the substrate, hardening the coating within a few seconds at a temperature of above 80° C., preferably above 100° C., to give a nontacky and stackable result.

The dispersions or emulsions according to the invention do not contain organic solvent and can be diluted with water. They are also free of monomers which could be copolymerized with the unsaturated polyesters.

The dispersions or emulsions according to the invention are virtually odor-free, and they are suitable for use as rapid-hardening coatings on many substrates. The hardened coatings are scratch-proof and resistant towards water, alcohol, household chemicals and solvents. Since water is the only diluent used, the dispersions or emulsions are nonflammable. Working equipment with which these materials come into contact can be cleaned by rinsing down with water. The additional use of crosslinking (sic) agents is dispensed with.

DESCRIPTION OF THE PREFERRED EMBODIMENTS

To effect hardening, cobalt accelerators and peroxide hardeners are added to the dispersions or emulsions according to the invention. At elevated temperatures above 80° C., nontacky hardening immediately commences after a short time. The very rapidly commencing nontacky film formation is supported and stabilized by additional crosslinking initiated by chemical hardening. It is of course also possible, after the addition of cobalt accelerators and peroxide hardeners, to harden the coating only at room temperature. However, in this case a film is obtained which has only inadequate technological properties.

Only those acrylate polymers are used in the dispersion or emulsion according to the invention, the film-forming temperature of which is above 60° C., and preferably it should be more than 100° C. Such acrylate polymers are known and commercially available. Acrylate polymers in the sense of the invention are understood as meaning homopolymers of acrylic acid derivatives and/or of methacrylic acid derivatives or copolymers of these compounds with other copolymerizable monomers. Particularly suitable monomers are styrene, vinyltoluene and methacrylates of lower aliphatic alcohols having 1 to 3 C atoms. Other monomers can be additionally used in small amounts up to a total of 25% by weight, relative to 100% of the total monomers. The acrylate polymers are, as a rule, prepared by the emulsion polymerization method and are then already present in the form of an aqueous dispersion.

The unsaturated polyester resins which can be used in the aqueous dispersions or emulsions are also known and commercially available. Their acid numbers are between 1 and 50, the OH numbers are between 10 and 120, and the mean molecular weights are between 300 and 5,000.

To obtain particularly good results, preferably all those unsaturated polyester resins are additionally used which contain cocondensed polyalkylene glycol radicals. Such unsaturated polyester resin types act as emulsifiers in the preparation of the unsaturated polyester resin emulsions. For example, they are unsaturated polyesters as described, for example, in European Patent Application No. 3,337.

The dispersions or emulsions according to the invention can be prepared in a simple manner by mixing the acrylate polymer dispersion with the unsaturated polyester emulsion. It is also possible to stir the aqueous acrylate polymer dispersion slowly into the polyester mixture, with the aid of a stirrer or dissolver.

In many cases, it is advantageous to add to the aqueous dispersions or emulsions according to the invention also plasticizers, fillers, flatting agents, pigments, additives or assistants, such as, for example, defoamers, thickeners and stabilizers, and wax or paraffin, and also acrylate resins having a low film-forming temperature. Acetone-resistance of the hardened finish film can be improved by adding up to 5% by weight of a water-soluble melamine-formaldehyde resin, for example hexamethoxymethylmelamine, relative to the solid resin content.

Examples of water-soluble peroxide hardeners suitable for hardening are hydrogen peroxide, acetylacetone peroxide, methyl ethyl ketone hydroperoxide, cyclohexanone peroxide and aqueous emulsions of water-insoluble peroxides. Suitable accelerators are heavy metal salts of carboxylic acids, such as the acetate, naphthenate or acetylacetonate salts of cobalt, manganese or vanadium. The accelerators are added, as a rule, in the form of their aqueous solutions or as aqueous emulsions.

Customary amounts which ensure excellent hardening are 0.5 to 5% by weight of peroxide and 0.01 to 0.2% by weight of heavy metal salt, relative to the total amount of unsaturated polyester resins used.

To stabilize light-sensitive substrates, small amounts of known UV absorbers can be added to the dispersions or emulsions, for example 2-hydroxy-4-methoxybenzophenone or cinammic acid derivatives or benzotriazine derivatives.

The aqueous dispersions or emulsions according to the invention can be applied by the customary application methods of spraying, rolling or casting to the substrate in a wet film thickness of up to 200 μm, preferably up to 100 μm. As a rule, the wet film thicknesses are less. Thus, for example, with the aid of roll application or doctor application, 8 to 15 g/m² are applied to non-splitting paper and 15 to 25 g/m² are applied to absorbent paper. 8 to 15 g/m² is proposed, as a rule, for application to aluminum foil.

The coating is hardened without intermediate hardening or predrying. Thus, a hard coating is obtained after a treatment period of only 10 seconds, when the coated substrate is exposed to a jet of air at 140° C. With the aid of an infrared radiator, drying is effected at an object temperature of 140° C. already after less than 5 seconds.

Owing to these extremely short drying times, web speeds of about 100 m/min. are obtained. This makes possible continuous and rapid working in finishing plants.

EXAMPLES

The polyesters and acrylate polymers used in the Examples had the following composition:

| Polyester (in moles) | A | B |
|---|---|---|
| Maleic anhydride | 1.0 | 1.0 |
| Propane-1,2-diol | 0.55 | |
| Polyethylene glycol (molecular weight 400) | | 0.79 |
| Trimethylolpropane diallyl ether | 1.0 | 0.4 |
| Acid number | 22 | 27 |
| Viscosity (mPas), measured as a 70% strength solution in styrene at 20° C. | 100 | 560 |

| Acrylate polymer (in parts by weight) from | |
|---|---|
| Styrene | 50 |
| Methyl methacrylate | 38 |
| Ethyl acrylate | 10 |
| Methacrylic acid | 2 |

| Composition and preparation of the dispersions or emulsions according to the invention, in parts by weight. | | | | |
|---|---|---|---|---|
| Example | 1 | 2 | 3 | 4 |
| Polyester A | 25 | 20 | 20 | 20 |
| Polyester B | | 5 | 5 | 5 |
| Acrylate polymer | 20 | 20 | 16 | 20 |
| Hexamethoxymethylmelamine | | | 5 | |
| Defoamer | 0.5 | 0.5 | 0.5 | 0.5 |
| Paraffin (melting point 57–60° C.) emulsion in water (10% strength) | 30 | 30 | 30 | 30 |
| Cobalt acetate (1% strength solution in water) | 0.5 | 0.5 | 0.5 | 0.5 |
| Water | 15 | 15 | 15 | 15 |
| Titania (rutile) | | | | 7 |
| Barium sulfate (Blanc fixe) | | | | 8 |

To prepare the dispersion or emulsion, first the acrylate polymer is processed with water in a dissolver into a dispersion, unless the polymerization had already been carried out in water as an emulsion polymerization.

The polyester resins A and B were diluted by means of a dissolver with the paraffin emulsion in water and the acrylate polymer dispersion. The remaining materials were then mixed in.

The resulting emulsion is stable. It is catalyzed with 0.25 part by weight of a 30% strength hydrogen peroxide solution. The emulsions obtained according to Examples 1, 2 and 3 are then rolled or doctored onto non-splitting paper. The amount applied was about 10 g/m². Drying was effected at an object temperature of 140° C. by means of an infrared radiator and for an irradiation time of 2 seconds. The resulting clear coating film was stackproof and, when using continuous paper web as substrate, could be wound up into a roll without individual layers adhering to one another.

Example 4 was applied to hardboard in a wet film thickness of 150 μm and hardened by means of a jet dryer at 140° C. in 60 seconds. The resulting film was scratchproof.

I claim:

1. An aqueous film-forming binder dispersion or emulsion comprising:
   (A) an unsaturated polyester resin produced from 1 mole of maleic anhydride, 0.55 mole of propanediol-1,2, and 1 mole of trimethylol propane diallyl ether, said polyester resin having an acid number between 1 and 50, an OH number between 10 and 120, and a mean molecular weight between 300 and 5,000; and
   (B) an acrylate polymer produced from esters of methacrylic acid or acrylic acid with lower aliphatic alcohols having 1 to 3 carbon atoms or mixtures thereof with other copolymerizable monomers selected from the group consisting of styrene, vinyltoluene and methacrylic acid, said polymer having a film-forming temperature of above 60° C.

2. The aqueous film-forming binder dispersion or emulsion of claim 1, wherein the dispersion or emulsion contains 70 to 30 percent by weight of unsaturated polyester resin, and 30 to 70 percent by weight of the acrylate polymer, the total sum of polyester resin and acrylate polymer being 100 percent by weight.

3. The aqueous film-forming binder dispersion or emulsion of claim 1, wherein a portion of the unsaturated polyester resin component contains co-condensed polyalkylene glycol groups.

4. The aqueous film-forming binder dispersion or emulsion of claim 1, wherein the dispersion or emulsion contains additionally up to 5% by weight, based on the solid resin content of a water-soluble melamine-formaldehyde resin or urea-formaldehyde resin.

5. The aqueous film-forming binder dispersion or emulsion of claim 1, wherein the dispersion or emulsion contains additionally plasticizers, flatting agents, fillers, pigments and auxiliaries.

6. A method for producing a rapid-hardening coating on a substrate comprising mixing a dispersion or emulsion comprising:

(A) an unsaturated polyester resin produced from 1 mole of maleic anhydride, 0.55 mole of propanediol-1,2, and 1 mole of trimethylol propane diallyl ether, said polyester resin having an acid number between 1 and 50, an OH number between 10 and 120, and a mean molecular weight between 300 and 5,000;

(B) an acrylate polymer produced from esters of methacrylic acid or acrylic acid with lower aliphatic alcohols having 1 to 3 carbon atoms or mixtures thereof with other copolymerizable monomers selected from the group consisting of styrene, vinyltoluene and methacrylic acid, said polymer having a film-forming temperature of above 60° C.; and (C) a water-soluble cobalt acceleration; and (D) a water-soluble peroxide hardener, and applying said mixture to said substrate to form a coating and hardening the coating at a temperature of about 80° C. for a time of 2 to 60 seconds to a non-tacky and stackable film.

7. The method of claim 6, wherein said substrate is selected from the group consisting of wood, wood materials, paper, fleeces, plastic sheetings, asbestos cement board, mineral fiber board, metals, and woven or nonwoven materials impregnated with impregnating resins in cured or uncured form.

* * * * *